United States Patent
Tufano

(10) Patent No.: US 10,438,075 B2
(45) Date of Patent: Oct. 8, 2019

(54) SYSTEM, DEVICE AND METHOD FOR CERTIFYING ELECTRONIC TRANSACTIONS

(71) Applicant: Francesco Tufano, Pero (IT)

(72) Inventor: Francesco Tufano, Pero (IT)

(*) Notice: Subject to any disclaimer, the term of this patent is extended or adjusted under 35 U.S.C. 154(b) by 0 days.

(21) Appl. No.: 15/122,566

(22) PCT Filed: Mar. 6, 2015

(86) PCT No.: PCT/EP2015/054728
§ 371 (c)(1),
(2) Date: Aug. 30, 2016

(87) PCT Pub. No.: WO2015/132386
PCT Pub. Date: Sep. 11, 2015

(65) Prior Publication Data
US 2017/0068864 A1    Mar. 9, 2017

(30) Foreign Application Priority Data
Mar. 6, 2014    (IT) .............................. MI2014A0344

(51) Int. Cl.
*G06K 9/00* (2006.01)
*G06K 19/06* (2006.01)
*G06Q 20/40* (2012.01)

(52) U.S. Cl.
CPC ... *G06K 9/00892* (2013.01); *G06K 19/06018* (2013.01); *G06K 19/06037* (2013.01); *G06Q 20/40145* (2013.01)

(58) Field of Classification Search
None
See application file for complete search history.

(56) References Cited

U.S. PATENT DOCUMENTS

| | | | |
|---|---|---|---|
| 5,280,527 A | 1/1994 | Gullman et al. | |
| 2007/0214093 A1 | 9/2007 | Colella | |
| 2010/0049659 A1* | 2/2010 | Cassone | G06F 21/32 705/64 |
| 2012/0109829 A1* | 5/2012 | McNeal | G06Q 20/3674 705/67 |

(Continued)

FOREIGN PATENT DOCUMENTS

| | | |
|---|---|---|
| CN | 1508746 A | 6/2004 |
| DE | 10334012 A1 | 2/2005 |

(Continued)

OTHER PUBLICATIONS

International Search Report dated Apr. 9, 2015 re: Application No. PCT/EP2015/054728; pp. 1-3; citing: DE 103 34 012 A1, WO 2013/050738 A2, US 2007/214093 A1, US 5 280 527 A.

(Continued)

*Primary Examiner* — Idowu O Osifade
(74) *Attorney, Agent, or Firm* — Cantor Colburn LLP

(57) ABSTRACT

A system for certifying a transaction includes a physical medium adapted to store an electronic code, a device for reading a biometric parameter of the user, and a device adapted to generate a code. The code is obtained from the pairing of the electronic code contained on the physical medium and of the biometric parameter detected by the reading device. The generated code is then stored on the physical medium.

7 Claims, 2 Drawing Sheets

(56) References Cited

U.S. PATENT DOCUMENTS

2013/0311372 A1* 11/2013 Ramaci ............... G06Q 20/322
                                                                                            705/44
2017/0032231 A1* 2/2017 Chapman ............. G06K 19/045

FOREIGN PATENT DOCUMENTS

JP         2002353958 A    12/2002
WO      2013050738 A2    4/2013

OTHER PUBLICATIONS

Written opinion dated Apr. 9, 2015 re: Application No. PCT/EP2015/054728; pp. 1-6; citing: DE 103 34 012 A1, WO 2013/050738 A2, US 2007/214093 A1, US 5 280 527 A.
JP Office Action dated Feb. 19, 2019 re: Application No. 2016-572914, pp. 1-6, citing: JP 2002-353958 A.

* cited by examiner

SYSTEM, DEVICE AND METHOD FOR CERTIFYING ELECTRONIC TRANSACTIONS

TECHNICAL FIELD

The present disclosure relates to a system, device and method for the certification of transactions, access control, and the like. More specifically, the disclosure relates to a system, device and method that make it possible to guarantee the security of an electronic transaction, such as for example a transaction conducted with a credit card, a payment card, or access control to sites and the like.

BACKGROUND

As is known, the necessity of certified transactions is increasingly felt in today's world and especially paired with payment cards, credit cards in general, telephone SIMs, security cards for access control and the like, and in general in all cases in which one has to be certain of the identity of the person who is making the transaction.

The systems currently in use for certifying a transaction performed by the user are based substantially on verification of the data contained on the card or physical medium in general that the user has, this data then being compared with data kept remotely on an adapted server and, following the positive outcome of the comparison, the transaction is authorized.

However, it is evident that, for example in the event of theft of a credit card, the wrongdoer could perform a transaction using the correct data of the card, and thus succeed in authorizing the transaction without this transaction having been actually authorized by the rightful owner (holder/proprietor) of the card.

Therefore, not only is there the necessity to make transactions performed by users certain, but there is furthermore the necessity to reduce the exchange of data remotely between the device that reads the card that the user has with the data present on a server in order to perform the comparison between the above mentioned data.

SUMMARY

The present disclosure provides a system, device and method for certifying transactions performed by a user, while at the same time eliminating the necessity of storing large amounts of data locally or remotely.

As such, the disclosure provides a system, device and method for certifying transactions of users which makes it possible to guarantee a greater level of security than transactions certified by conventional systems.

The present disclosure also provides a system, device and method that are highly reliable, easily and practically implemented and low cost.

The disclosure provides a system for certifying a transaction, characterized in that it comprises a physical medium adapted to store an electronic code, a device for reading a biometric parameter of the user, and a device adapted to generate a code obtained from the pairing of the electronic code contained on the physical medium and of the biometric parameter detected by the reading device, and to store the code thus generated on said physical medium.

BRIEF DESCRIPTION OF THE DRAWINGS

Further characteristics and advantages of the disclosure will become better apparent from the detailed description of a preferred, but not exclusive, embodiment of the system, device and method according to the present disclosure, which is illustrated by way of non-limiting example in the accompanying drawings, wherein.

DETAILED DESCRIPTION OF THE DRAWINGS

Figure 1:
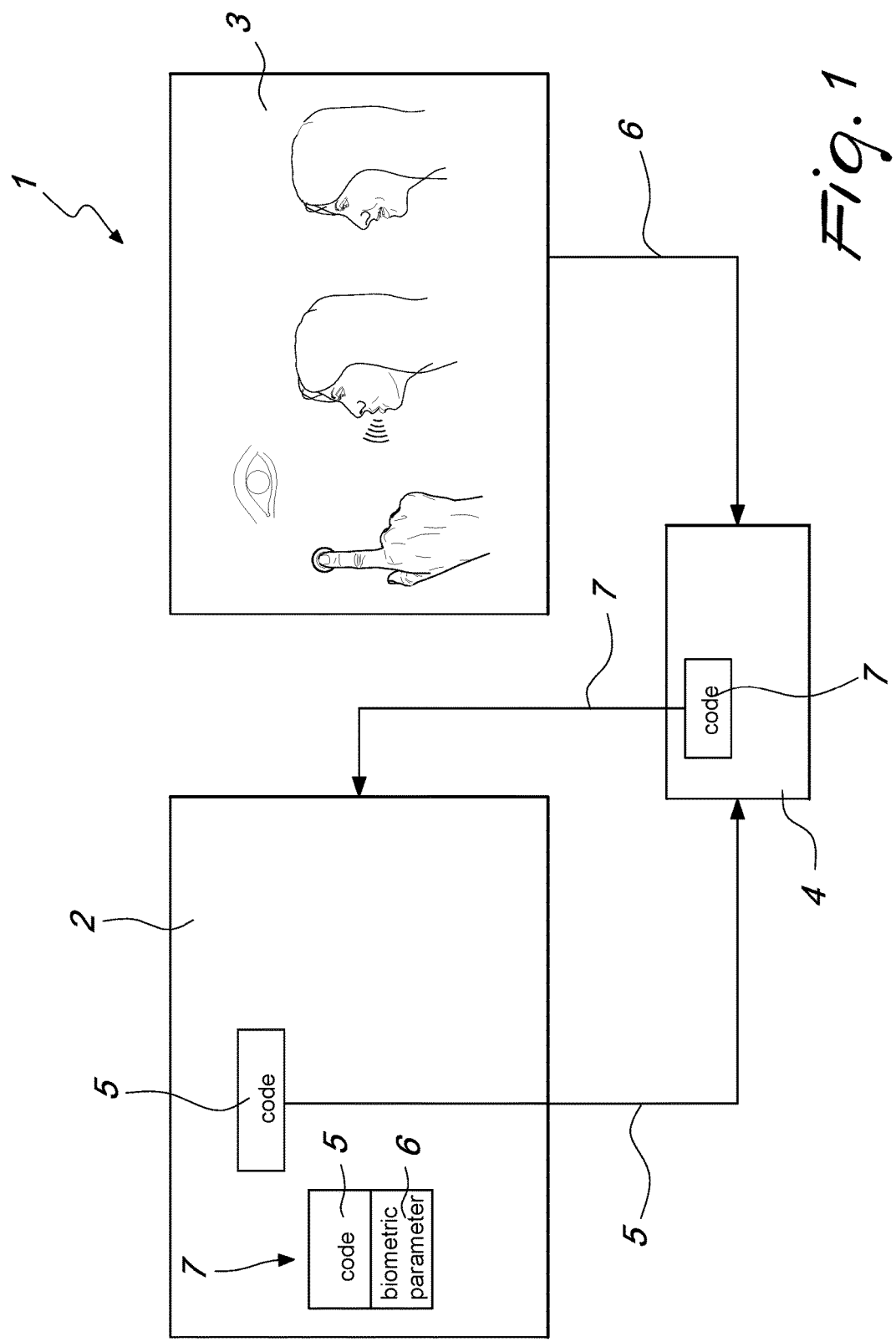
FIG. 1 is a schematic view of the system according to the present disclosure.
Figure 2:
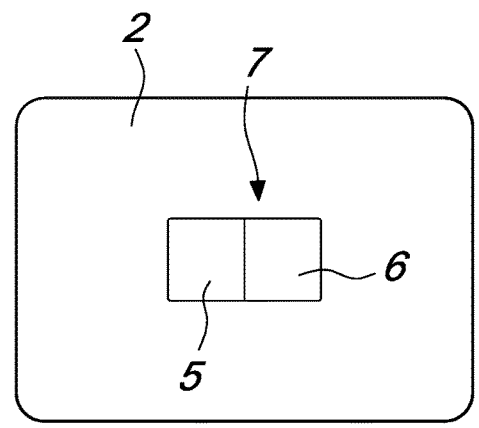
FIG. 2 is a schematic view of the device according to the present disclosure.
Figure 3:
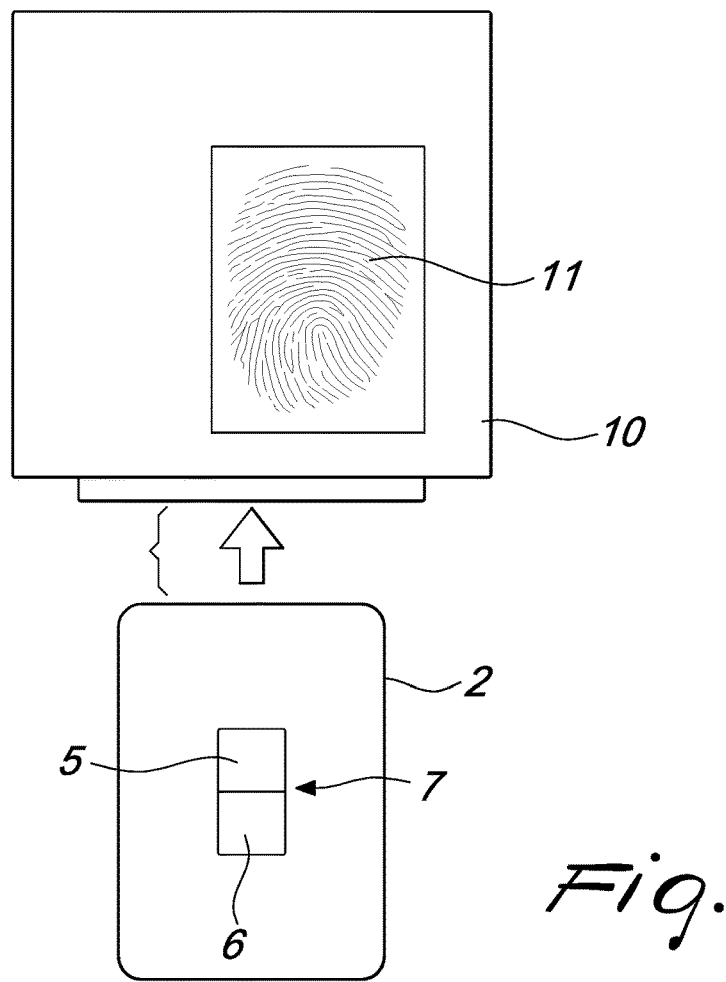
FIG. 3 is a schematic view of the use of the device according to the disclosure.

With reference to FIGS. 1-3, in which identical reference numerals designate identical elements, the system according to the present disclosure, generally designated by the reference numeral 1, comprises a physical medium 2, for example a credit card, prepaid card, security card, health service card, access control card and the like, which constitutes the element that enables the user to perform a certified transaction.

Conveniently, the system according to the disclosure includes a device 3 for reading a biometric parameter of the user, such as, for example, their fingerprint, their iris, or a system for recognizing the voice of the user.

The system according to the disclosure is completed by a device 4 for generating a code that is adapted to be stored on the physical medium 2.

The code generated by the device 4 is obtained from the pairing of an electronic code 5 that is present on the fixed medium 2, which can be a numeric code, an alphanumeric code or the like, and which can for example be in the form of a barcode, a QR code, or even stored in an RFID tag, in a microchip or in a SIM, and is paired, in the device 4, to a (biomedical) parameter or to a corresponding biometric code, designated by the reference numeral 6, for the generation of a combined code 7 which is stored on the physical medium 2.

The generation of the combined code 7 can occur with different levels of security. In a first embodiment, the combined code 7 can be constituted by a concatenation of the electronic code 5 and of a biometric code generated from the biometric parameter in question.

The biometric parameter can be for example translated to a numeric or alphanumeric sequence on the basis of a selected algorithm, in which the biometric parameter is a single entry parameter to the algorithm for generating the biometric code, according to the formula cb=f(pb), where cb is the biometric code, pb the biometric parameter, and f is the transformation function.

In a preferred embodiment, the biometric code is instead generated using the electronic code as parameter of the transformation function, according to the formula cb=f(ce, pb), where ce is the electronic code and the rest of the formula terms are the same as in the previous example.

This second embodiment obtains a greater level of security, in that the generation of the combined code is obtained by pairing the electronic code to a biometric code which, for the same biometric parameter used (for example a fingerprint of the owner), varies as a function of the electronic code of the card, thus giving different results.

In this manner it is virtually impossible, for example, to generate a correct combined code, even in the event of fraudulent interception of the biometric code of a user.

According to a further preferred embodiment, it is possible to use an additional personal code, for example a PIN selected by the user, in order to generate the biometric code.

In this case, the biometric code would be the result of the following function: cb=f(ce, PIN, pb).

The PIN code can be for example selected by the user at card creation time. The person skilled in the art will effortlessly grasp the possibility of using different variations of the above method, for example a function cb=f(PIN, pb) for generating the biometric code for pairing to the electronic code in order to generate the combined code.

FIG. 1 thus shows the device according to the disclosure which is constituted by the physical medium 2 containing the combined code 7 constituted by the pairing of the electronic code 5 and of the biometric parameter 6.

In the method according to the disclosure, at transaction time, the user presents the physical medium 2 on which is stored the code 7 constituted by the pairing of the electronic code 5 and of the biometric parameter 6.

The user, at this point, in order to perform the transaction, passes the physical medium 2 through an adapted reader 10, which reads the code 7, which is constituted by the pairing of the electronic code 5 and of the biometric parameter 6, in so doing triggering an operation of comparison with a biometric parameter, which corresponds to the biometric parameter stored on the physical medium 2, which is read when the user makes the transaction.

To this end, the device 10 has a device 11 for reading biometric parameters, which makes it possible, for example for the operator of a sales point, to read, at transaction time, the biometric parameter of interest, in order to generate a second code constituted by the electronic code 5 read from the physical medium 2 of the user and paired to the biometric parameter read by the device 10. This code generated at transaction time is compared, inside the device 10, with the code stored on the physical medium 2.

For example, in the event of using a fingerprint, the user will place his/her fingertip on a fingerprint reader. In the event of using the iris, the user will bring his/her eye close to a video camera connected with the system. Starting from the information acquired, the system will apply the same computing algorithm used for the generation of the code stored on the physical medium 2, verifying that the result obtained with the application of the selected algorithm is the same.

In this manner, there is no exchange of data between the device 10 and a remote server for a comparison between codes, but such comparison is performed directly within the device 10, in reading the biometric parameter of the user.

The immediate and local certification of the transaction thus avoids having the biometric parameter of the user in local memory on the reading device 10 or remotely on the central system.

The system, the device and the method described above can be advantageously applied to payment cards, telephone SIMs, identity cards, health service cards, electronic money, security cards, access control cards, and in general in all sectors in which it is necessary to have a certified transaction.

In a further preferred embodiment, it is possible to differentiate the electronic code on the basis of an additional parameter, which identifies for example a supplier code, so as to generate different codes according to the context of use.

For example, the physical medium can store a plurality of combined codes or of biometric codes, each one generated by a function of the type cb=f(supplier_id, pb, . . . ).

In this manner, it is possible to assign to each supplier or verifier a reader device 10 that operates according to a different algorithm, where each supplier is divided by category, area or whatever.

To give an example, a gasoline station could have a supplier code of 0001 and a supermarket could have a supplier code of 0002. At the time of using the card with the reader used by the supermarket, the algorithm will also take the parameter 0002 as its input, thus generating a combined code that will be compared with what is stored on the physical medium in a memory slot corresponding to the code 0002.

In the event of using the card at the gasoline station with the supplier identity of 0001, the check will be done by comparing the result of the algorithm executed as a function both of the biometric parameter and of the supplier code 0001, comparing the result with what is available in the respective memory slot.

The system, device and method, thus conceived, are susceptible of numerous modifications and variations. Moreover, all the details may be substituted by other, technically equivalent elements.

In practice the materials employed, and the contingent dimensions and shapes, may be any according to requirements and to the state of the art.

The disclosures in Italian Patent Application No. MI2014A000344 from which this application claims priority are incorporated herein by reference.

The invention claimed is:

1. A system for certifying an electronic transaction, comprising a portable physical medium adapted to store an electronic code, a first device for reading a biometric parameter of the user, and a device adapted to generate a code obtained from a pairing of the electronic code contained on the portable physical medium and of the biometric parameter detected by the first reading device, and to store the code thus generated on the portable physical medium, the portable physical medium storing the code constituted by the pairing of the electronic code and of the biometric parameter, the system further comprising a device adapted to read the code stored on the portable physical medium, at transaction time, the device comprising a second device for reading a biometric parameter of the user, at transaction time, configured to generate a new code obtained from a pairing of the electronic code read from the portable physical medium and the biometric parameter detected by the second reading device, the new code generated at transaction time being compared with the code stored on the portable physical medium, such comparison being performed directly by the device.

2. The system according to claim 1, wherein said electronic code is a numeric code.

3. The system according to claim 1, wherein said electronic code is an alphanumeric code.

4. The system according to claim 1, wherein said electronic code is a barcode, a QR code, or a code obtained from an RFID.

5. The system according to claim 1, wherein said electronic code is a code stored in an RFID tag, a microchip, or a SIM.

6. A device for guaranteeing a certified electronic transaction, comprising a portable physical medium storing a code which is constituted by an electronic code paired with a biometric parameter of the user, the device being adapted to read the code stored on the portable physical medium, at transaction time, the device comprising a device for reading a biometric parameter of the user, at transaction time, configured to generate a new code obtained from a pairing of the electronic code read from the portable physical medium and the biometric parameter detected by the reading device, the new code generated at transaction time being compared with the code stored on the portable physical medium, such comparison being performed directly by the device.

7. A method for certifying an electronic transaction by using a system according to claim 1, comprising the steps of:
- by way of the code reading device, detecting the code stored on the portable physical medium, which includes a pairing of the electronic code with the biometric parameter;
- generating a new code, at transaction time, by detecting, by way of the second reading device, the biometric parameter of the user;
- pairing the biometric parameter detected at transaction time with the electronic code that is present on the portable physical medium of the user;
- comparing the code stored on the portable physical medium of the user with the new code and verifying that the code stored on the portable physical medium and the new code match, such comparison being performed directly by the device; and
- authorizing the transaction if the code stored on the portable physical medium and the new code match.

\* \* \* \* \*